United States Patent [19]

Hendrick

[11] Patent Number: 4,901,977
[45] Date of Patent: Feb. 20, 1990

[54] GEAR DRIVE FOR A DISK

[75] Inventor: Fred W. Hendrick, Cerritos, Calif.

[73] Assignee: Automatic Control Components, Inc., Denver, Colo.

[21] Appl. No.: 360,779

[22] Filed: Jun. 2, 1989

[51] Int. Cl.⁴ .................. F16K 31/53; F16K 25/00
[52] U.S. Cl. .................. 251/249.5; 251/208; 251/248; 251/304; 74/420; 74/421 A
[58] Field of Search ............ 74/420, 421 A; 251/205, 251/206, 208, 304, 58, 129.01, 248, 249, 249.5

[56] References Cited

U.S. PATENT DOCUMENTS

| 1,305,111 | 5/1919 | Hutchinson | 74/420 |
| 1,428,693 | 9/1922 | Hulse | 74/420 |
| 1,623,056 | 4/1927 | Kenan | 251/248 |
| 1,894,927 | 1/1933 | Schmitter | 74/420 |
| 1,986,252 | 1/1935 | Conran | 251/248 |
| 3,630,484 | 12/1971 | Taylor | 251/208 |
| 4,304,261 | 12/1981 | Forester | 251/249.5 |
| 4,432,387 | 12/1984 | Sims | 251/249.5 |
| 4,440,382 | 4/1984 | Pruvot et al. | 251/208 |

Primary Examiner—George L. Walton
Attorney, Agent, or Firm—Clifford A. Poff

[57] ABSTRACT

A disk valve construction having a unitary valve body. The valve is opened and closed by rotation of a drive shaft which is maintained in geared connection with a rotator spool positioned in an internal cavity of the valve body. The drive shaft extends in a direction substantially perpendicular to the longitudinal axis of the valve body. The drive shaft may be supported in a housing assembly to allow pressurization thereof for valve operation with steam and hazardous materials.

9 Claims, 2 Drawing Sheets

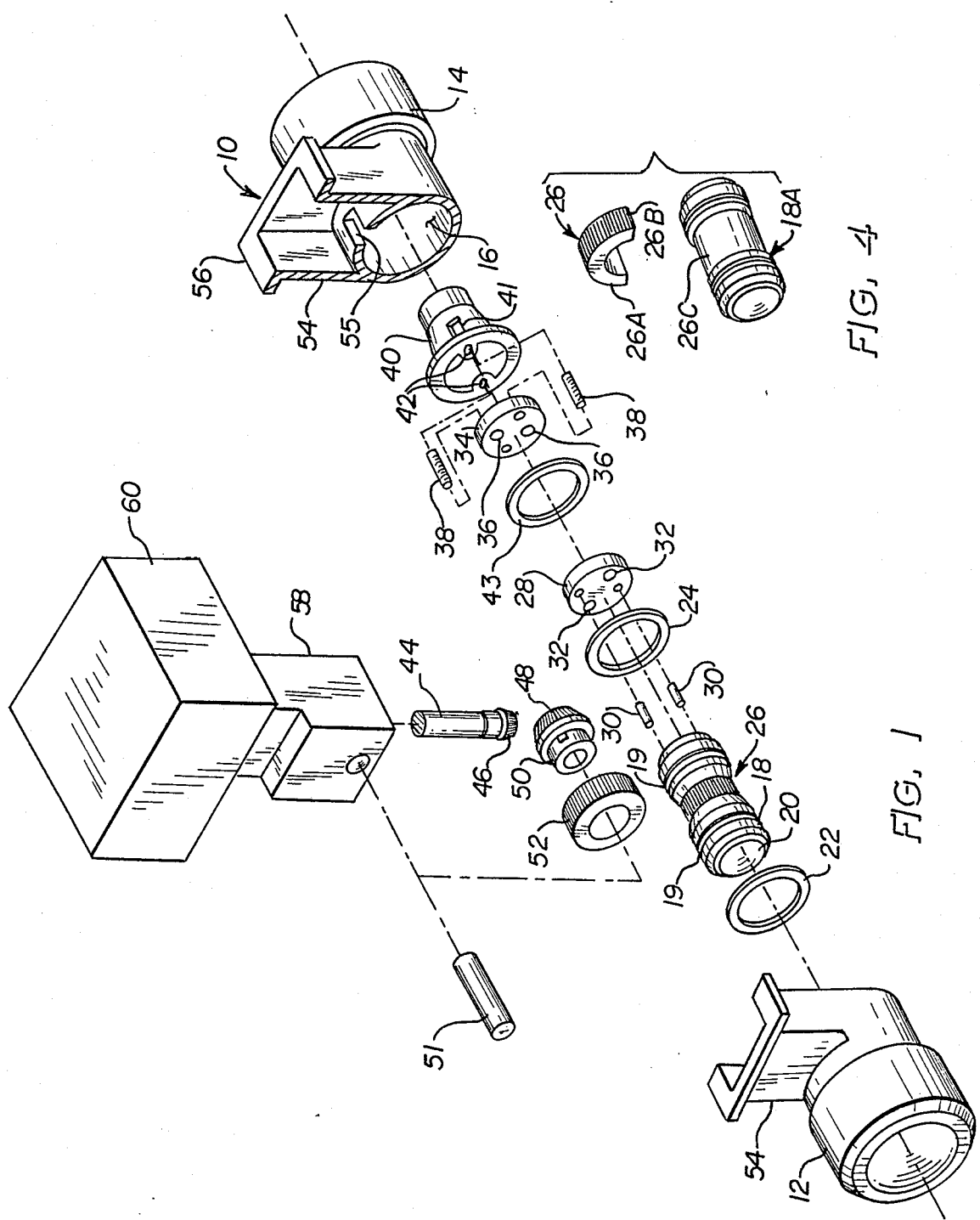

GEAR DRIVE FOR A DISK

BACKGROUND OF THE INVENTION

1. Field of the Invention:

The present invention relates to a valve having relatively movable face to face disk members each with a fluid opening which can be brought into and out of fluid conducting alignment for discharging fluid to a discharge port, and, more particularly, to a gear drive for rotating a rotator member while drivingly interlocked with one of the disk members and thereby control the operation of the valve formed by a sleeve anchored to the valve body.

2. Description of the Prior Art:

Disk valves are well known in the art, and have particular application as control valves for regulating the flow of high pressure fluids, such as steam, and gas and oil at a wellhead.

In general, a disk valve is comprised of a valve body having an inlet port, and an outlet port interconnected by an internal cavity. Two disks are positioned in a confronting, face-to-face relationship in the internal cavity. The disks are of diameters suitable for installing and operation in of the internal cavity of the valve body. Each disk is provided with at least one opening through which the flow of fluid is allowed when the openings of the disks are in any degree of alignments with one another. Relative angular movement between the disks allow the openings of the disks to be rotated into and out of alignment with one another in order to alternately provide a passageway for fluid flow through the valve or prevent the flow of fluid through the valve. The flow rate of the fluid may also be controlled by maintaining a desired degree of relative alignment or misalignment between the openings of the disks.

In order to effect relative angular movement, between the disks, one of the disks, usually the upstream disks, is permitted rotational movement, and the second disk, usually the downstream disk, is supported in a fixed position relative to the valve body. A rotator spool is positioned in the internal cavity of the valve body. and contains a fluid passageway to allow the flow of fluid there through. The spool is affixed to the rotatable disk to rotate therewith. The rotator spool is provided with one or more grooves at each of opposite ends portions of the spool to allow sealing rings to be affixed thereto to provide a seal separating the input portion of the valve body from the output portion of the valve body, and to prevent fluid leakage. A control handle is connected to extend radially from the rotator spool through a suitably located annular slot in the valve body. A torque applied to the control handle causes rotation of the rotator spool and the rotatable disk. The valve is thereby manually operated between positions of disks opened and closed. However, to allow such rotation, an annular slot must be formed in the valve body to expose and connect with the rotor spool.

The annular slot formed in the valve body must be of a size to allow rotation of the control handle to fully open and fully close the valve, and in many designs, the annular slot is formed to extend through usually at least 90 degrees about the circumference of the valve body. The valve body must be design and constructed for the weakening affects due to the slot for the rotor handle. There is also an ever present danger that the containment entry in the annular slot in the housing which could be detrimental to the material of the rotor seals causing premature failure.

In such designs, the control handle must be unobstructed and free to rotate through the entire operating range. When the valve is used in applications were remote control is applied the possibility exist that the handle could move without warning thereby creating a dangerous condition for anyone particularly workmen in the vicinity of the valve.

Further, in such valve designs, actuation of the valve by any other than manual means is difficult in that the control handle must swing through an entire range of angular positions to open and close the valve. In high pressure application, larger forces than can usually be developed by an average person may be required to operate the valve. Also, in hazardous environments, particularly explosive environments, the size and shape of the slot for the operating handle in the valve body fails to meet fire safe requirements.

It is accordingly the object of the present invention to provide an improved disk valve construction to overcome the aforementioned this advantages and short comings of known disk valves.

It is a further object of the present to provide an improved drive means for actuating a disk valve.

SUMMARY OF THE INVENTION

In accordance with the present invention, a control valve is disclosed for controlling the flow of the fluid. The valve includes a valve body forming an inlet port and a outlet port, separated by an internal cavity. An elongated rotator spool is positioned in the internal cavity of the valve body and is allowed rotational movement about a longitudinal axis extending along the rotor. The rotator spool contains a fluid passageway extending longitudinally therethrough, and gear means are carried by this spool. An upstream disk is affixed to a downstream side of the rotator spool and is rotatable therewith. The upstream disk also contains a fluid passageway for conducting fluid from the fluid passageway of the rotator spool. A downstream disk, supported in a non-moving relationship relative the valve body is maintained in a confronting, face-to-face relationship with the upstream disk; the downstream disk further contains a fluid passageway for conducting fluid to the discharge port during those times in which the fluid passageway of the upstream disk is aligned in a fluid-conducting relationship with the fluid passageway of the downstream disk. A gear drive including gear teeth messing with the spool for rotating the spool to thereby control operation of the valve.

In a preferred embodiment of the present invention, the gear means of the elongated rotator spool is comprised of a plurality of gear teeth spaced about a portion of an outer circumference of the rotator spool. In one embodiment, the gear teeth are integrally formed on the rotator spool. In another embodiment of the present invention, the gear teeth are part of a gear segment affixed about an outer circumference of the rotator spool. The gear segment are gear teeth on the rotator spool are preferably situated between seal members at body of opposite longitude end portion of the spool.

The drive means preferably includes a drive shaft connected with a gear member at an end portion thereof, for meshing engagement with the gear means of the rotator spool, and a means for rotating the drive shaft about a longitudinal axis thereof particularly compact arrangement is provided when the drive shaft extends in a direction substantially perpendicular to the rotational axis of the rotator spool. The valve body is typically provided with an extension so as to form a drive housing section to ingress of foreign material to the site of this seals on the rotor spool and provides for the use of a single actuating shaft that rotates about its longitudinal axis whereby the design of the valve body and drive allows compliance with fire safe standard and thus use of the valve in such applications.

In a further embodiment of the present invention, a housing assembly is included for supporting the drive shaft and for housing the gear means. The area enclosed by the housing assembly may further be maintained at a controlled and/or pressurized and the outside temperature atmosphere independent of the material and the pressure conducted by the valve body.

BRIEF DESCRIPTION OF THE DRAWINGS

The features and advantages of the present invention as well as others will be more fully understood when read in light of the accompanying drawings in which:

FIG. 1 is an exploded, isometric view of a disk valve embodying the features of the present invention;

DESCRIPTION OF THE PREFERRED EMBODIMENTS

Figure 3:
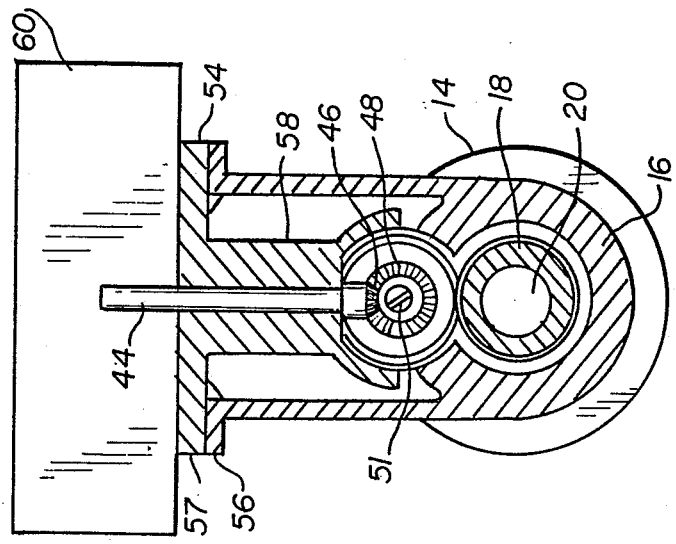
FIG. 3 is a cross-sectional view taken along lines III—III of FIG. 2.

Referring first to the exploded view of FIG. 1, there is shown the disk valve, according to one embodiment, of the present invention. The Valve includes a valve body 10 having an inlet portion 12 and an outlet 14. Preferably, and as illustrated, inlet and outlet portions 12 and 14 contain threaded end portions to allow threaded connection with external piping. Other means of connection are also, of course, possible. The valve body 10 defines an internal cavity 16 between portions 12 and 14. An elongated rotator spool 18 having fluid passageway 20 along the longitudinal axis thereof is positioned within internal cavity 16. Grooves 19 are formed in the cylindrical surface of spool 18 at each of opposite end portions to allow sealing. O-rings 22 and 24 are mounted, in the grooves 19 at opposite ends of the rotator spool 18. A mid-portion of rotator spool 18 is of a reduced diameter whereat gear means 26 is located. In embodiment shown in FIGS. 1-3 of the present invention, gear means 26 is comprised of a plurality of gear teeth which are machined in the material comprising of the rotator spool 18 thus the gear teeth are an integral part of the spool. In a second embodiment of the present invention shown in FIG. 4, gear means 26 having gear teeth 26B and is comprised of a semi-cylindrical gear segment 26A affixed in a suitable recess 26C formed in a central area a rotator spool 18A as shown.

Figure 2:
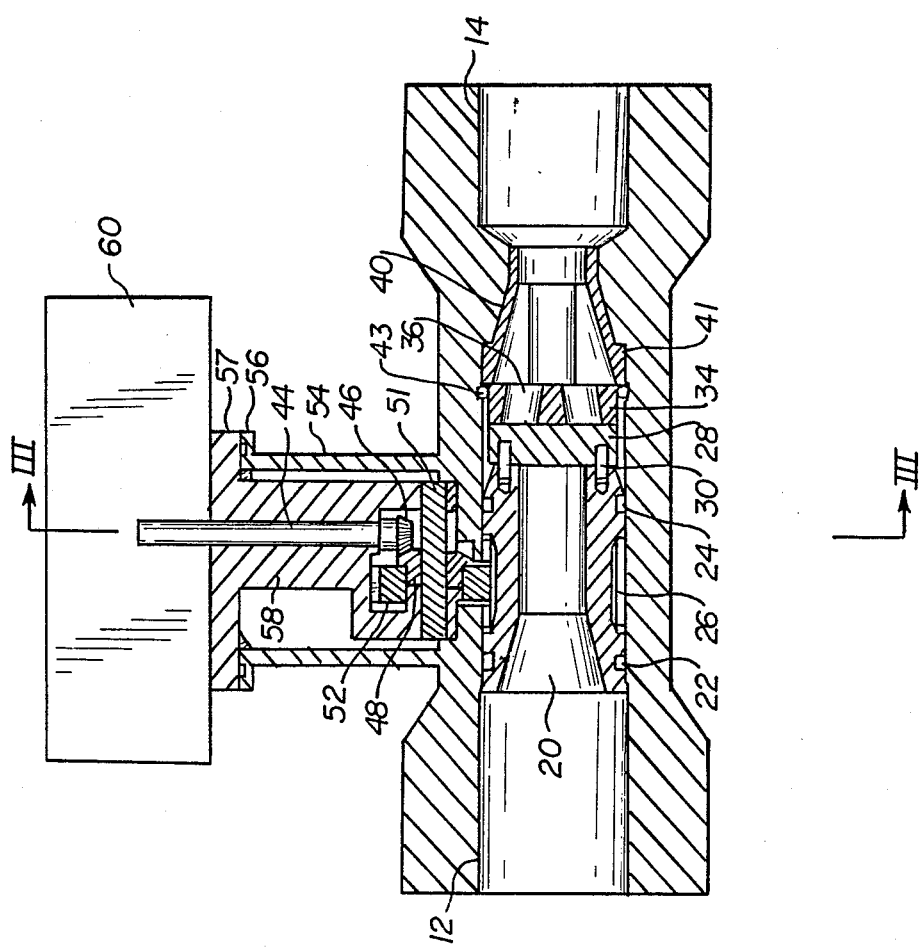
FIG. 2 is a longitudinal, sectional view of the disk valve of the present invention.

According to both embodiments and as shown in FIG. 2, affixed to the outlet side, or downstream side, of rotator spool 18 is an upstream disk 28. Disk 28 is affixed to the spool by means of pins 30 which are fitted in openings in the downstream end face of spool 18. Illustrated in FIG. 1 is a disk 28 containing two openings or orifices 32 to provide a passageway for fluid. Both rotator spool 18 and the upstream disk 28 affixed thereto are rotatable in the internal cavity 16 of the valve body 10.

As can be better seen in FIG. 2, downstream disk 34 is positioned face-to-face, confronting relationship with upstream disk 28, and contains openings or orifices 36 corresponding in number and diametrical position to orifices 32 of disk 28. The sectional view of FIG. 2 illustrates the valve in the closed position wherein the openings 32 and 36 ar in relative misalignment. Downstream disk 34 is not rotatable in the internal cavity 16 of valve 10, but, rather, is maintained in a fixed position by anchor pins 38. The preferred embodiment of FIGS. 1-3 further includes replaceable sleeve 40 containing bores 42. Anchor pins 38 extend through bores 42 formed as drilled openings in the sleeve 40. Sleeve 40 is anchored to portion 14 of the valve 10 by lugs 41 to thereby affix downstream disk 34, and replaceable sleeve 40, in position. As shown in FIG. 2, an O-ring seal 43 is positioned between disk 34 and the valve housing 14 to prevent fluid flow beyond disk 43 and particularly between sleeve 41 and housing sleeve.

The rotor spool 18 rotates about an axis extending along the extended length driven by a drive assembly that includes drive shaft 44 having bevel gear 46 secured to a end portion. Gear 46 meshes with a bevel gear 48 rotatably supported by spindle 51. A pinion gear 52 is mounted on the hub extension 50 and drivingly interconnected by a key 53. Gear teeth of pinion 52 meshes with teeth of gear means 26 formed on rotator spool 18. In the embodiment of FIG. 4, the pinion 52 meshes with the gear teeth 26B of the gear segment 26A. The meshing relation between pinion 52 and teeth of the gear means is established and maintained by an interfitting and supporting relationship between a valve extension and a drive housing next to be described.

The preferred embodiment of the present invention further includes an upstanding valve housing extension which is an integral part of the valve body. Extension 54 has a opening 55 exposing gear means 26 for meshing engagement with pinion gear 52. Extension 55 includes a flange 56 which is attachment means for an overlying flange 57 of a drive housing 58 for housing gears 46, 48, and 52, and for supporting drive shaft 44. The area enclosed between housing extension 54 and drive housing 58 when desired, is pressurized above atmospheric pressure, which is of particular benefit when the fluid flowing through the valve is combustible. Also, the tortuous path between the outside atmosphere and opening 55 affords the valve design of the present invention fire safe usages. Illustrated in FIGS. 1-3 is an aperture 55 in the valve body communicating with the internal cavity 16 at a particular site chosen to allow pinion 52 to extend therein to allow meshing engagement between pinion 52 and gear means 26.

Further illustrated in FIGS. 2-3 is actuator 60 shown in block form. Actuator 60, as is conventional in the art, may be electrically, hydraulically, or pneumatically operated to cause rotation of drive shaft 44.

When suitably connected, the valve 10 of the present invention functions as a flow control valve for controlling the flow of fluid through the valve. Fluid entering the valve 10 through the inlet port of the inlet portion 12 first passes through the fluid passageway 20 of the rotator spool 18. The fluid then passes through openings 32 of the upstream disk 28. If it is desired to open the valve to allow fluid to flow therethrough, actuator 60 is actuated to rotate drive shaft 44 to bring opening 32 and 36 of disks 28 and 34 into alignment. Rotation of drive shaft 44 causes meshing of gears 46, 48, and 52, and, in turn, of gear means 26 of the rotator spool 18 to cause rotation of the rotator spool. Because upstream disk 28 is affixed to spool 18, and caused to rotate therewith, the openings 32 of disk 28 are rotated into alignment with the openings 36 of downstream disk 34. When the openings 32 and 36 are properly aligned, fluid is allowed to pass from the inlet port of inlet portion 12 to the outlet port of outlet portion 14.

When, conversely, it is desired to close the valve, and to prevent the flow of fluid therethrough, actuator 60 rotates drive shaft 42 in order to cause the rotator spool 18 to rotate the upstream disk 28 to misaligned openings 32 and 36, to thereby block the flow of fluid through the valve. The flow rate of the fluid may be controlled by partially aligning the openings 32 and 36 of disks 28 and 34.

It is thus seen that the valve 10 may be opened or closed by merely rotating drive shaft 44. Because drive shaft 44 may be enclosed in drive housing section 58, there is no exposed linkage to create a potentially hazardous condition such as may occur in unintended opening or closing of the valve. Additionally, through appropriate selection of the gear ratios of the gearing, the required sizing of the actuator may be reduced. For example, if the gear ratio is 2:1 and if a torque of 500 inch-pounds is required to rotate spool 18 and disk 28, then the required input torque of the actuator 60 to operate the valve is only 250 inch-pounds. Further, addition of housing assembly 58 and extension 54 allows the valve 10 of the present invention to be utilized in valve application involving combustible materials; additionally, drive housing section 54 serves to protect the gearing and the rotator 18.

While the present invention has been described in accordance with the preferred embodiments of the various figures, it is to be understood that other similar embodiments may be used or modifications and additions may be made to the described embodiment for performing the same functions of the present invention without deviating therefrom. Therefore, the present invention should not be limited to any single embodiment, but rather construed in breadth and scope in accordance with the recitation of the appended claims.

What is claimed is:

1. A valve for controlling the flow of fluid, said valve including:
    a valve body having an inlet port and an outlet port separated by an internal cavity;
    an elongated rotator spool extending a substantial distance within said internal cavity having a fluid passageway extending longitudinally therethrough for conducting fluid from the inlet port of the valve body;
    gear means carried by said rotator spool for rotating said spool about an axis extending along the length of the internal cavity of the valve body;
    an upstream disk affixed to a downstream side of said rotator spool as an assembly unit within said internal cavity, said upstream disk having a fluid passageway extending therethrough for conducting fluid from the fluid passageway of the rotator spool;
    a downstream disk supported by the valve body in a confronting, face-to-face relationship with the upstream disk, said downstream disk having a fluid passageway extending therethrough for conducting fluid from the fluid passageway of the upstream disk; and
    drive means including gear teeth meshing with said gear means of the rotator spool for rotating the rotator spool and the upstream disk affixed thereto, such that the fluid passageways of the rotator spool and the upstream disk may be moved into and out of a fluid-conducting relationship with the fluid passageway of the downstream disk.

2. The valve of claim 1 wherein said gear teeth of said gear means extend about a portion of an outer periphery of the rotator spool.

3. The valve of claim 2 wherein said gear means is integrally formed on the rotator spool.

4. The valve of claim 2 wherein said gear means includes a gear segment affixed about an outer circumference of the rotator spool.

5. The valve of claim 1 wherein said drive means includes a gear member engaged with a drive shaft, and operating means for rotating said drive shaft through said gear member.

6. The valve of claim 5 wherein said drive shaft is rotatable about an axis extending in a direction substantially perpendicular to axis of the rotator spool.

7. The valve of claim 5 wherein said means for rotating the drive shaft includes an actuator.

8. The valve of claim 5 further wherein said valve body includes a housing section for supporting said drive shaft and said means for rotating.

9. The valve of claim 8 wherein said housing section forms a sealed chamber with said valve body.

* * * * *